April 11, 1939.    J. J. ALLEN    2,153,907
MECHANICAL MOPPER FOR INSECTICIDES
Filed May 6, 1938    2 Sheets-Sheet 1

Inventor
Joseph J. Allen

By Ralph J. Bassett
Attorney

April 11, 1939.  J. J. ALLEN  2,153,907
MECHANICAL MOPPER FOR INSECTICIDES
Filed May 6, 1938  2 Sheets-Sheet 2

Inventor
Joseph J. Allen
By Ralph J. Bassett
Attorney

Patented Apr. 11, 1939

2,153,907

UNITED STATES PATENT OFFICE 2,153,907

MECHANICAL MOPPER FOR INSECTICIDES

Joseph J. Allen, Allendale, S. C.

Application May 6, 1938, Serial No. 206,491

7 Claims. (Cl. 299—29)

This invention relates to improvements in machines applying by a mopping operation, insecticides and similar materials to growing plants such as potatoes, cotton and the like.

Generally the invention includes a frame supported by a suitable wheel arrangement, the frame including a pair of longitudinally spaced uprights for mounting the mopping mechanism and a pair of transversely positioned supporting elements for adjustably mounting the handles of the structure and the reservoir from which the mopping mechanism is supplied with the insectiside or other material.

In addition the present development includes an elongated pan positioned laterally of the frame and provided with an inclined bottom for accumulating the insecticide escaping from the mopping elements.

Still other features of novelty reside in the mounting of the mopping reel to permit its elevation to a vertical position and the arrangement of the control valve between the supply and the mops so that the insecticide or like material cannot reach the mops when the reel is elevated.

Other features will more clearly hereinafter appear by reference to the accompanying drawings and specification, and wherein like characters of reference designate corresponding parts throughout the several views, in which Fig. 1 is a side elevation.

Figure 1:
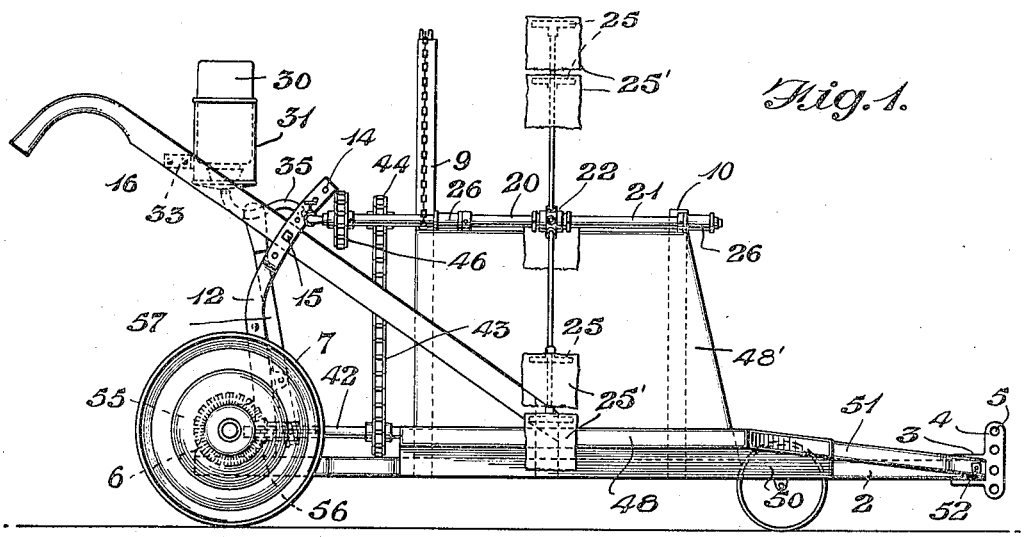
Figure 2:
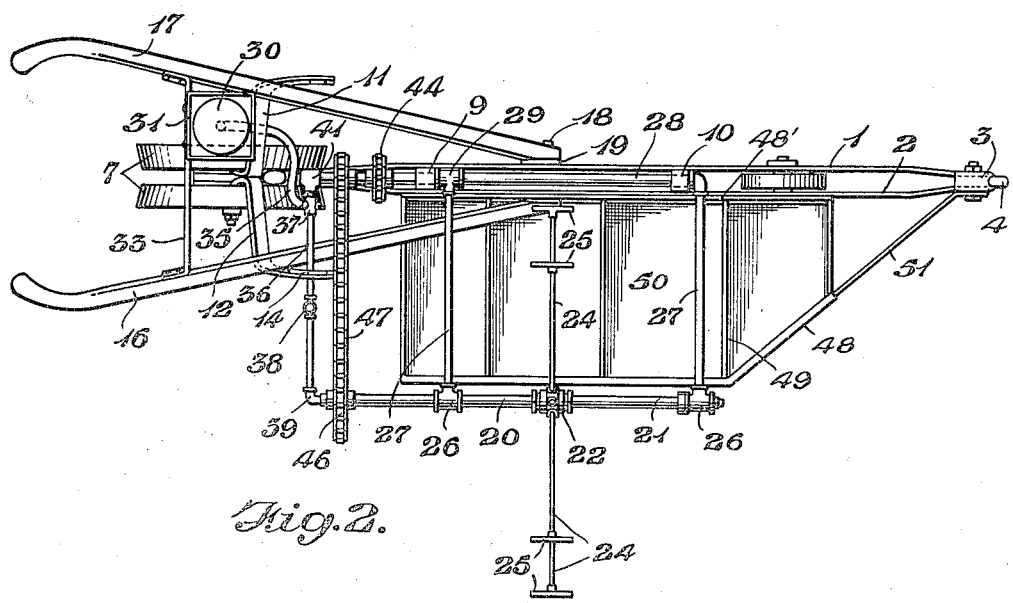
Fig. 2 is a top plan view.
Figure 3:
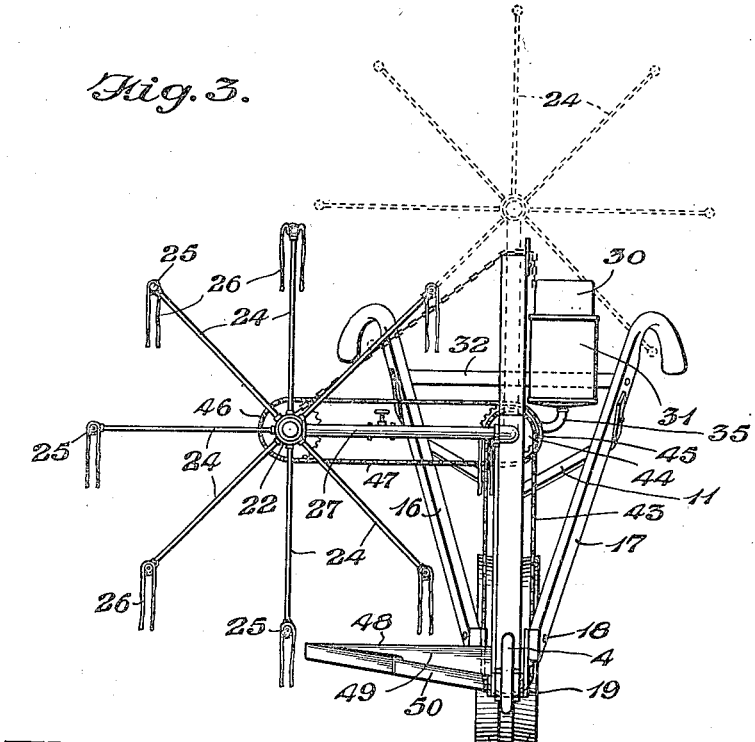
Fig. 3 is an end view with the mopping reel dotted in its elevated position.

The frame supporting the parts of the assembly is swung quite low to the ground level and is shown as including a pair of longitudinally extending spaced bars 1 and 2 converging at their front to be bolted to the usual power connection 3 disclosed as including a vertically extending bar 4 provided with a plurality of perforations 5 to permit suitable adjustment. The rear end of the bars 1 and 2 converge to contacting relation and are suitably secured to a hanger 6 mounted on the axle between the two sections of the wheel 7. The bars 1 and 2 are reinforced at desired points by suitable blocks 8 which may be bolted or welded in position. Extending vertically from the frame formed partially by the bars 1 and 2 are the uprights 9 and 10, the rear upright 9 extending well above the front upright 10 for purposes hereinafter disclosed. A pair of forwardly bent arms 11 and 12 are supported from the hanger 6 and extend upwardly and forwardly. These arms contact for a major portion of their length from the hanger 6 upwardly and then are bent outwardly and upwardly, and are perforated at 14 to provide for the bolts 15 securing the handles 16 and 17 in adjusted position. The handles 16 and 17 extend forwardly and are bolted to the frame members 1 and 2 by means of bolts 18 and connecting plates 19. The connecting plates 19 are secured to the upper walls of the frame and extend slightly above the same as more clearly shown in Figure 3.

Figure 4:
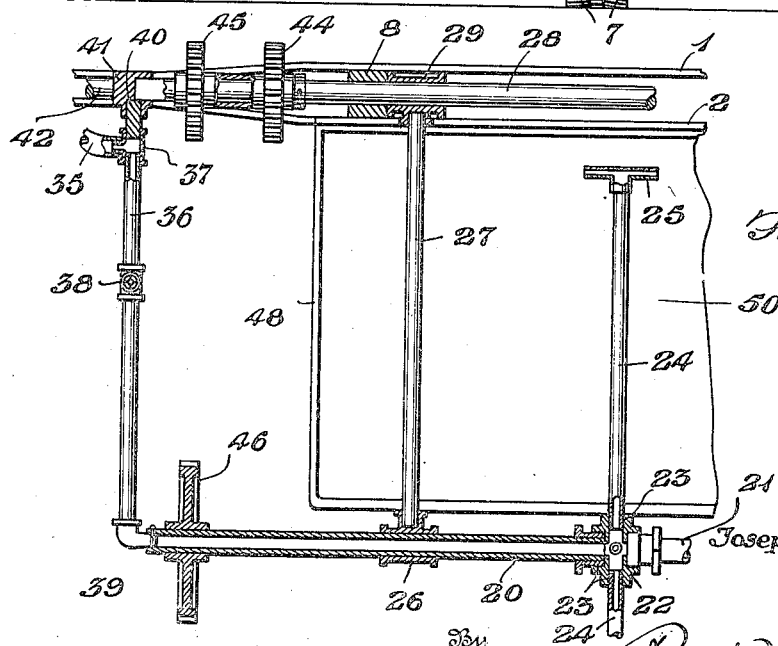
Fig. 4 is a transverse section showing certain of the parts broken away.

The mopping element is in the form of a reel and includes the rotatable sections 20 and 21 connected together at their adjacent inner ends by the coupling 22, the latter being provided with a multiplicity of threaded openings 23 in which the inner ends of radiating pipes or arms 24 are threaded. The arms 24 terminate in perforated T-heads 25 and the mopping cloths 25' are secured about these perforated heads in any desired manner whereby the material from the hollow tube members 20 may be fed thereto through the tubular arms 24. The tube sections 20 and 21 are rotatably mounted in the bearings 26 supported at the ends of the arms 27. The arms 27 are rotatably mounted on the shaft 28 by means of the bearings 29 as shown more clearly in Figure 4. By this arrangement the reel may be swung upwardly moving the connecting arms 27 from horizontal to vertical position and elevating the reel and mops carried thereby out of working contact with the plants. A container 30 preferably of the Mason jar type with its cap perforated is provided to supply the insecticide or other material. The jar 30 having its cap perforated and being supported in inverted position in the container 31 mounted on the cross frame 33. A flexible pipe 35 connects this supply of insecticide with the mop by means of pipe 36, the flexible pipe 35 being connected thereto through the union 37. The valve 38 controls the flow of fluid through the pipe 36 and through the mop reel. The end of the pipe 36 terminates in the L connection 39 which is threaded into the end of the pipe section 20. A plug or rod section 40 closes one end of the coupling element 37 and connects the same to the bearing 41 by means of which the pipe 36 is mounted for swinging movement in cooperation with the reel.

For driving the reel any suitable means may be provided, however, in the present illustration power taken from the ground wheels 7 geared at 55 by means of shaft 42 and splined gear 56 is transferred through gear and chain drive 43 to the gear 44 mounted on the shaft 28. A gear shift lever 57 is utilized to slide the gear 56 into and out of mesh with the gear 55 for controlling this drive means. The shaft 28 may be rotatable in its bearing or the gear 44 may be rotatably mounted on the shaft 28 and by means of the hub shown in Figure 4. The gear 45 also mounted on the hub transmits power by means of the chain 47 to the gear 46 on the hollow shaft 20 and drives the latter and the reel carried thereby, to produce the mopping operation against the plants.

Fixed laterally to the right hand side of the frame member 2 is the elongated pan 48 provided with partitions 49 and inwardly and downwardly inclined wall bottom sections 50. The pan may be so shaped that the fluid contained therein may be gathered from a single lowermost point of the pan structure. In this event the partitions will necessarily be perforated and will operate as non-splashing baffles. A brace 51 extends along the outer longitudinal and front inclined wall portions and connects and supports the same by the bolt 52 which extends through the frame.

The vertical wall or panel 48' extending vertically of the frame members 1 and 2 and connecting the uprights 9 and 10 tends to remove and transfer the waste insecticide from the mops to the pans as will be obvious.

I claim:

1. In a device of the character described, a ground wheel including power take-off means, a hanger supported by the ground wheel, an elongated frame connected to the hanger including a pair of spaced bar members, spaced uprights carried by the frame, a rotatable reel, means swingably mounting said reel on said spaced uprights, a drive connection between the power take-off and reel, a pan supported by said frame and extending partially beneath said reel, and a panel positioned above said frame and extending between said uprights.

2. In a device of the character described, an elongated frame, spaced uprights supported by said frame, a reel including mop elements, a swinging frame supporting said reel carried by said uprights, drive means for said reel, a partitioned pan extending laterally of the frame and partially beneath said reel a panel extending vertically between said uprights, a source of fluid supply and means for conducting said fluid to said mop elements.

3. The substance of claim 2 characterized in that the reel assembly is hollow and serves as a conduit for transferring fluid to the mop elements.

4. In a device of the character described, a frame member including a pair of elongated spaced bars merging at their extremities and connected at their front end to a coupling element and at their rear end to a wheel supported hanger, spaced uprights carried by said frame, a swinging frame carried by said uprights, a rotatable reel fixed to the end of said swinging frame, means for driving said reel, mop elements carried by said reel, a fluid container, means for conducting fluid from the container to the mop elements, a pan fixed to the frame and extending partially beneath said reel, and a panel element positioned between said uprights to intercept said mop elements during the rotation of said reel.

5. The substance of claim 4 characterized in that handles are provided which are connected to the spaced frame members and to the hanger, the connection with the hanger including upright arms having outwardly bent portions.

6. The substance of claim 4 characterized in that the reel is formed of hollow tubing which acts as a conduit to convey fluid to the mop elements, which latter are fixed to perforated portions of the reel structure.

7. In an insecticide mopping apparatus including a portable frame having ground wheels and a power take off connected to the ground wheels, an elongated frame extending forwardly of the ground wheels, uprights carried by the frame, a rotatable reel including a plurality of radiating arms, a swinging supporting frame mounted on the uprights, drive means for the reel connected to the power take off, handles connected to the frame and to the hanger, a fluid receptacle supported by the handles, means for conducting fluid from the receptacle to the reel, a pan fixed to one side of said frame and extending laterally beneath a portion of the reel, and a panel supported between the uprights and below the reel support.

JOSEPH J. ALLEN.